Oct. 25, 1966  J. A. MAS  3,281,640
BATTERY AND CHARGING MEANS THEREFOR
Filed April 19, 1963 4 Sheets-Sheet 1
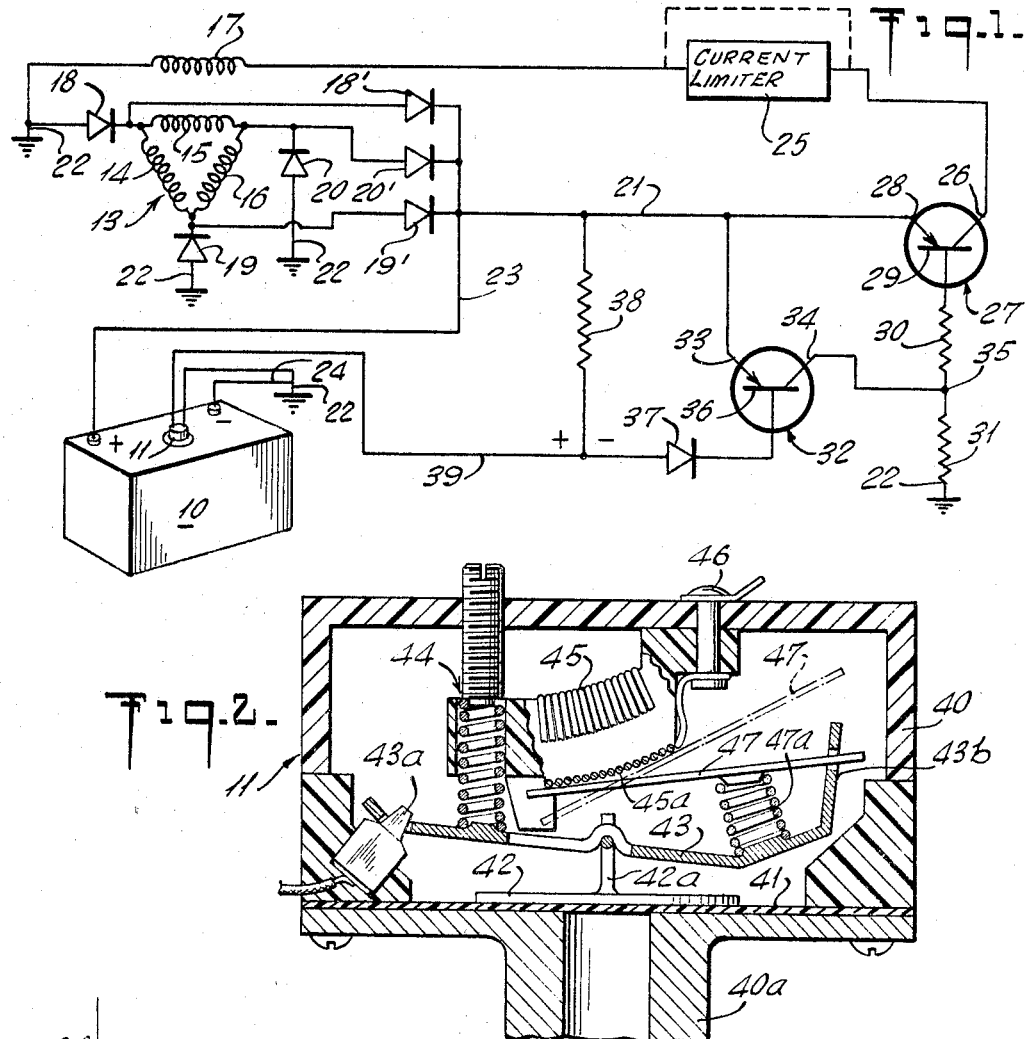
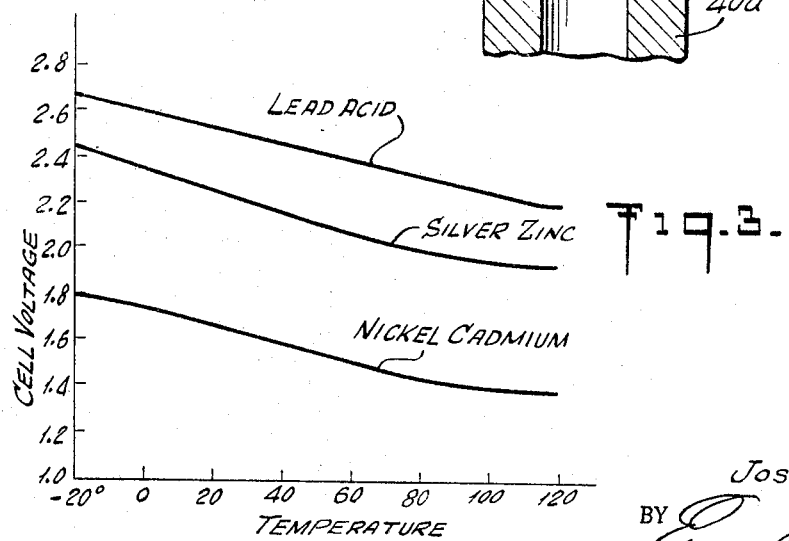
INVENTOR.
JOSEPH A. MAS
BY *Eugene E. [signature]*
ATTORNEY

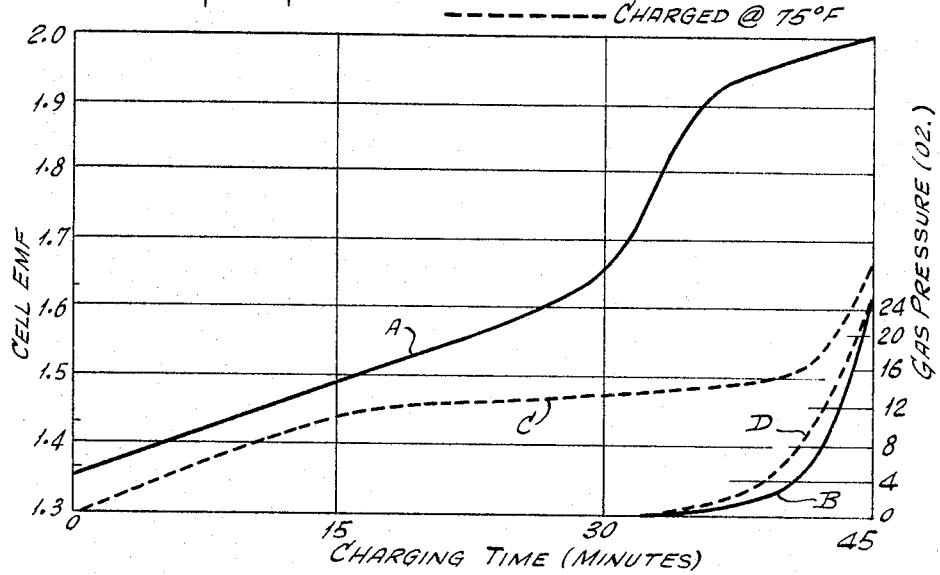
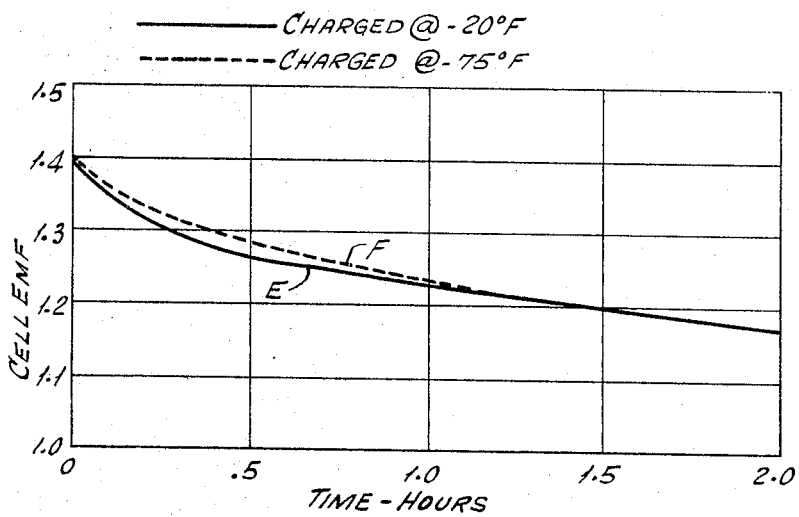

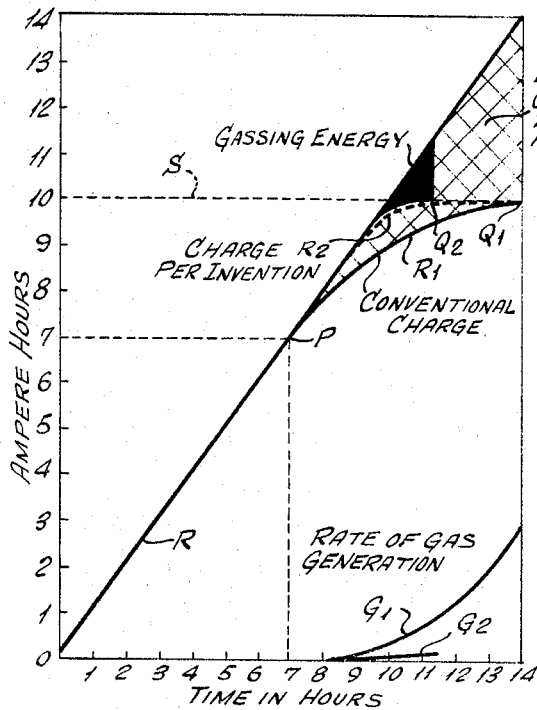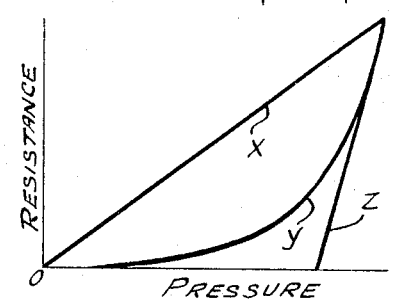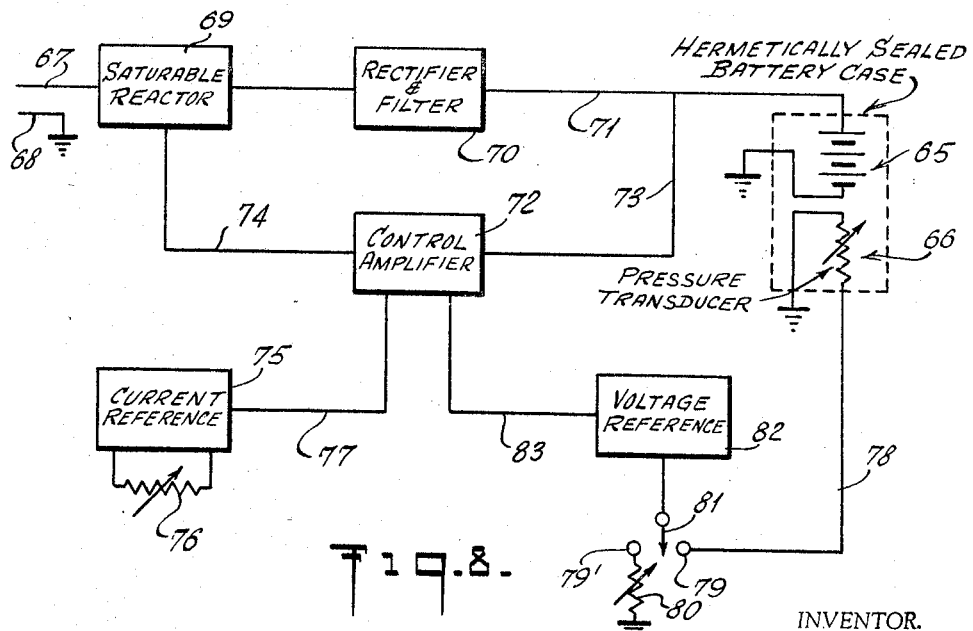

Oct. 25, 1966  J. A. MAS  3,281,640
BATTERY AND CHARGING MEANS THEREFOR
Filed April 19, 1963  4 Sheets-Sheet
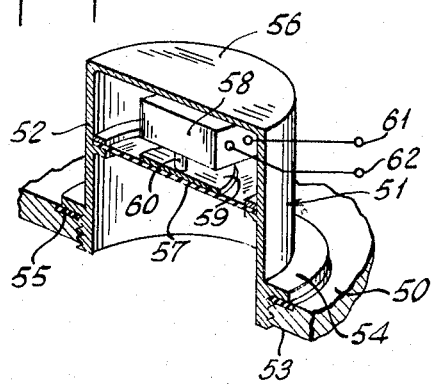
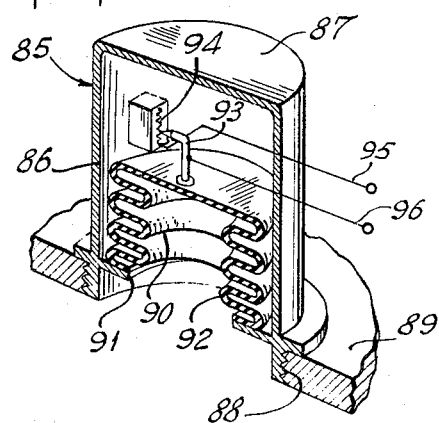
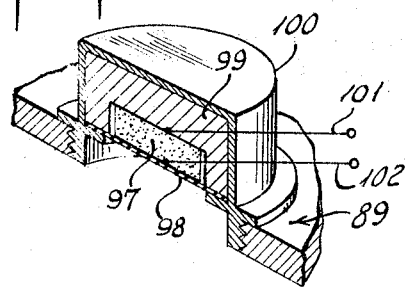
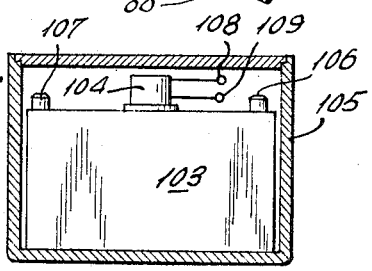
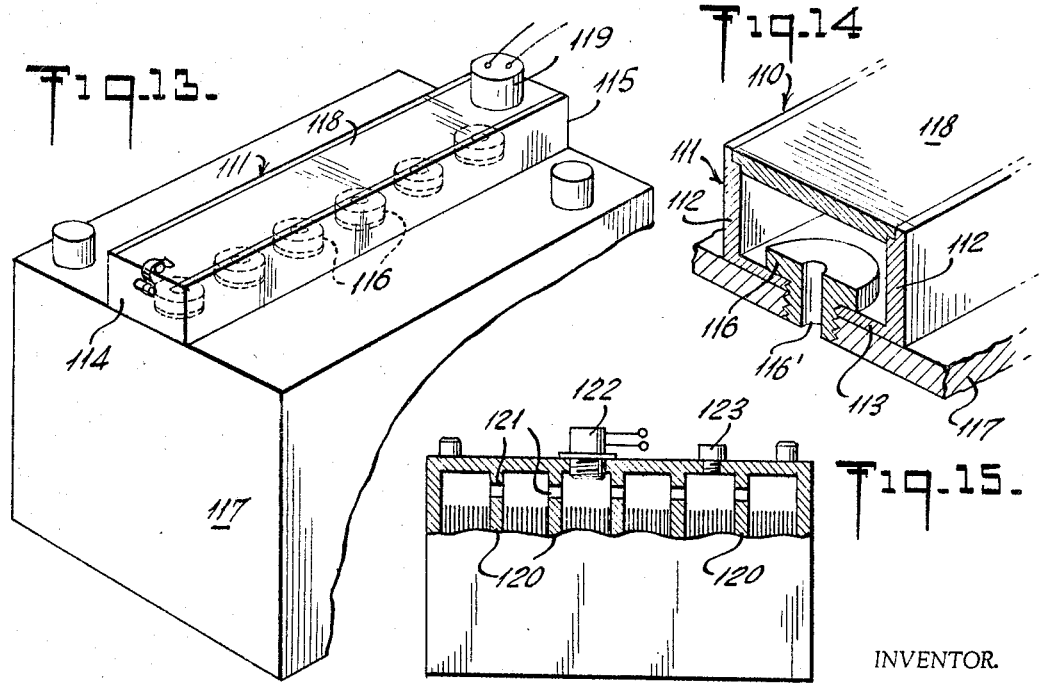
INVENTOR.
JOSEPH A. MAS
BY
ATTORNEY

United States Patent Office 3,281,640
Patented Oct. 25, 1966

3,281,640
BATTERY AND CHARGING MEANS THEREFOR
Joseph A. Mas, Woodbury, N.Y., assignor to Dynamic Instrument Corp., Plainview, Long Island, N.Y., a corporation of New York
Filed Apr. 19, 1963, Ser. No. 274,260
7 Claims. (Cl. 320—46)

This invention relates to batteries and charging systems therefor. It more specifically concerns novel and improved means for sensing and controlling the charge on a battery that will insure maximum energy storage under all operating conditions, afford improved efficiency in conversion of electrical energy to chemical energy, provide a reduction in charging time and prevent battery damage through overcharging.

Known charging systems for batteries have generally been controlled by voltage regulating devices wherein the charging apparatus responded to a predetermined battery voltage to interrupt the charge. A typical example of the voltage regulated charging system is that found in the automotive vehicle. In such a system, the regulator is interconnected with the automobile generator and battery and includes means for regulating the charge on the battery by sensing battery voltage for limiting the maximum current of the generator and for disconnecting the generator from the battery when the engine speed is below a preselected R.P.M.

Another mode for controlling the charge on a battery involves the utilization of a current responsive device so that when the charging current falls below a predetermined value, the battery is considered fully charged.

The foregoing charging systems fail to take into consideration the characteristics of a battery, such as a lead-acid cell, for instance, at various temperatures. It has been found in the case of a lead-acid cell as well as other types of batteries that the attainment of a full charge varies with temperature, that is, a battery at a lower temperature must be charged to a higher voltage than the same battery at a higher temperature. By charging the battery to some median voltage, as in the case of charging devices in use today, the batteries will be undercharged at low temperatures and overcharged at high temperatures. Partially charged batteries can freeze at temperatures of the order of 0° F. and freezing of a battery causes material internal damage. Overcharging of a battery results in the generation of gas which is discharged through a venting orifice, and gassing of a battery not only results in the loss of electrolyte but may also result in plate damage. Furthermore, with the constant loss of electrolyte, frequent filling is required with the attendant possibility of contamination by minerals that may be contained in the water. The importance of maintaining a battery at full charge is supported by statistics, which have generally indicated that more than half of the battery failures in automotive equipment result from undercharging.

Numerous procedures have been suggested to control the charge applied to a battery including the utilization of adjustable regulators to vary manually the charging voltage, but since the proper charging procedure varies with temperature conditions of the battery, battery age and other factors, manual control is not satisfactory.

Still another mode for determining the full charge condition of a battery and particularly liquid type batteries involves measurement of the specific gravity of the electrolyte. While this is a satisfactory procedure, serious difficulties are entailed since the specific gravity of a fully charged battery varies with temperature, age and condition of the battery, and automatic measurement of specific gravity would involve complicated and expensive equipment.

Temperature compensation for voltage regulated battery chargers has been found effective as it overcomes the difficulty entailed by voltage controlled devices. However, it does not compensate for battery age nor does it afford any improvement in efficiency of energy conversion.

In charging batteries such as lead-acid cells and the like, it has been found that with the charging system in accordance with the invention, a greater quantity of energy can be stored in the battery and at a more rapid rate than with known charging systems. This increased energy storage is obtained by reason of an improved method and apparatus for effecting the charge which results in faster and more complete charging of each of the plates of the battery without the danger of overcharging, and this is effected notwithstanding the actual temperature of the battery during the charging period. As will be shown, this improved charging system and apparatus in accordance with the invention is equally applicable to all types of batteries both wet and dry.

This invention overcomes the difficulties heretofore encountered with charging systems described above, and contemplates the provision of an improved battery and charging means therefor wherein the charge voltage is regulated automatically in accordance with the physical and electrical characteristics of the battery and the temperature of the electrolyte so that the battery will be charged fully, safely and with improved energy conversion efficiency. The charging procedure in accordance with the invention is applicable to substantially all types of batteries including wet batteries as exemplified by lead-acid, nickel-cadmium and silver-zinc cells, and dry batteries such as zinc-carbon, mercury and the like.

Other charging systems heretofore proposed suggest the utilization of auxiliary devices of one form or another within the battery and operable to interrupt the charge before a full charge condition is achieved. One such device consists of an auxiliary gassing electrode that produces a gas pressure within the battery in advance of gas generation of the battery itself. Another device suggests the provision of a vented battery with gas pressure responsive means that will stop the charging procedure when excessive gas pressure is attained. These devices do not afford maximum efficiency in energy conversion nor do they enable the attainment of maximum charge at the operating temperature.

Another object of the invention resides in the provision of a novel and improved battery and cooperating sensing means for sensing a physical condition of the battery and operable to regulate or control the charge being applied to the battery to enable the attainment of a full charge and without the danger of overcharge.

Another object of the invention resides in the provision of novel and improved control systems for charging batteries.

The above and other objects and advantages of the invention will become more apparent from the following description and accompanying drawings forming part of this application.

In the drawings:

FIGURE 1 is a diagrammatic illustration of a battery and charging means therefor in accordance with the invention.

FIGURE 2 is a cross-sectional view of the gas pressure sensing means shown in FIGURE 1.

FIGURE 3 is a graphical illustration of cell voltage versus temperature for representative types of cells.

FIGURE 4 is a graphical illustration of the charging characteristics of a typical type of wet cell.

FIGURE 5 is a graphical illustration of the discharging characteristics of a typical wet cell.

FIGURE 6 is a theoretical graphical illustration comparing the charging cycle of a typical cell when performing in a conventional manner and in accordance with the invention.

FIGURE 7 is a graph showing several modes of controlling the charging rate in accordance with the invention.

FIGURE 8 is a block diagram of a modified control system for charging batteries in accordance with the invention.

FIGURE 9 is a cross-sectional view of one form of pressure responsive mechanism for controlling the charging of a battery in accordance with the invention.

FIGURES 10 and 11 are modified forms of charge controlling devices.

FIGURE 12 is a cross-sectional view of a cell battery and pressure transducer in accordance with the invention.

FIGURE 13 is a perspective view of a conventional battery arranged to be charged in accordance with the invention.

FIGURE 14 is a cross-sectional view of FIGURE 13 taken along the line 14—14 thereof.

FIGURE 15 is a cross-sectional view of a multicell battery in accordance with the invention.

Charging systems for batteries and particularly vehicular charging devices of the type used in automobiles and the like for charging lead-acid batteries have presented rather serious problems because of the wide range of temperatures over which they are operated and the varying conditions of the batteries. Present vehicular charging devices are essentially voltage regulators which control the charging rate of the battery in accordance with the battery voltage. For many years, electromechanical voltage regulators have been used and as it was costly to introduce some mode of temperature compensation, the voltage regulator was adjusted to provide a full charge for the battery at some median temperature, the full charge condition being determined by the battery voltage at that temperature. Under these conditions, if a temperature of 40° F. is selected as a median, then the charging system does not fully charge a battery at any temperature below 40° F. and overcharges the battery at temperatures above 40° F. It is known that both undercharging and overcharging of batteries results in material damage and shortened life, and tests have indicated that with charging systems utilizing voltage as the governing parameter, a battery does not in fact receive a full charge even at the median temperature. It has been found that even though the battery voltage reaches a level indicating a full charge, only portions of the plates have been charged and that it is possible to impart still additional energy to the battery and fully charge all portions of the plates. With this invention, a battery can be fully charged without any danger of overcharging and thus greatly extend battery life. The charge is also effected within a minimum time and maximum efficiency. Furthermore, with this improved charging system, factors such as battery temperature, battery condition and the like are automatically taken into consideration thereby overcoming the serious disadvantages of known charging systems and particularly automotive or vehicular systems presently in use.

In the preferred embodiment of the invention, the battery is provided with a sensing device, as, for instance, a pressure responsive variable impedance device. The pressure-sensitive means is coupled to the battery to sense the gas pressure. By interconnecting this device with the charging circuit, it will function automatically to control the charge so that a predetermined gas pressure will be generated within the battery and maintained within selected limits. Thus, if a sufficiently high charging voltage is applied to the battery to fully charge the battery, then as soon as the battery has attained a preselected gas pressure, the voltage will be reduced and regulated to maintain the gas pressure within such limits. Actual tests have indicated that this procedure not only fully charges the battery more rapidly but also more efficiently. In addition, the plates of the battery are substantially uniformly charged, a condition not attainable with known practices. As a result, batteries charged in accordance with the invention have more stored energy than batteries charged to the same voltage using known practices, such as voltage regulators. Another important aspect of the invention resides in the action of the battery during charge and when a load is applied. Should the charge have produced gas pressure in the battery and a load is then applied, the gas pressure falls quickly indicating that gas pressure is reconverted into electrical energy. Since the gas generated within the battery cannot escape, it follows that maintenance of the gas pressure during charge retards gas generation, and the loss of gas pressure as the battery is discharged indicates re-absorption and consequently reversion of the energy used in producing the gas to useful electrical energy. Thus, very high charging efficiencies are obtained.

A preferred control system particularly useful for wet cells such as the lead-acid battery involves the utilization of a transducer which responds to gas pressure and modifies an electrical control characteristic in accordance with such pressure. A typical example of a transducer involves the provision of a variable resistor interconnected with a diaphragm or bellows so that the resistance will be varied in accordance with changes in pressure. By interconnecting this resistor with an appropriate current control system, the charging voltage or current can be gradually reduced as the battery begins to develop gas pressure and automatically interrupted when a predetermined maximum pressure has been attained. This provides an effective and desired mode of control and while it is particularly useful in connection with the so-called wet batteries, the system would be equally applicable to all types of batteries.

One form of the invention is shown in FIGURE 1 which illustrates an improved charging regulator for charging batteries in accordance with the invention. In this figure, the battery to be charged is denoted by the numeral 10 and includes a pressure sensing device or transducer 11 of any desired form. This transducer is coupled to one or more cells of the battery so that it will sense gas pressure within the battery 10. While the voltage generating means for charging the battery may take any desired form, an alternator with cooperating rectifiers has been illustrated and denoted generally by the numeral 13. The alternator includes a delta-connected stator having windings 14, 15 and 16 and an armature containing a single phase field winding 17. As the field is rotated by an automotive engine or other prime mover, a three phase voltage will be generated in the stator windings. A group of six rectifiers 18 to 20 and 18' to 20' are connected to provide full wave rectification of the stator voltage, and the rectified voltage appears between the conductor 21 and ground 22.

The output of the generator 13 is fed via the lead 23 to the positive terminal of the battery 10, and the negative terminal of the battery 10 is connected by a lead 24 to the ground 22. The field coil 17 has one side connected to the ground and the other side is connected via a current limiting device 25 to the collector 26 of a transistor 27. The emitter 28 of the transistor 27 will control the current to the field 17 of the generator and in turn control the output voltage. The base 29 of transistor 27 is connected through two series-connected resistors 30 and 31 to the ground. The values of the resistors 30 and 31 are selected so that when the generator is operated, sufficient current will flow through the transistor 27 to saturate the field 17 and produce maximum output voltage from the generator.

The generator voltage is controlled by the cooperation of a second transistor 32 with the transistor 27. The transistor 32 has an emitter 33 connected to the lead 21 and a collector 34 connected to the junction 35 between the resistors 30 and 31. The base 36 is connected through a reference voltage diode 37 and through the pressure responsive impedance device or transducer 11 to the ground 22. A resistor 38 is connected between the lead 21 and the lead 39, the latter connecting the voltage reference diode 37 to the pressure responsive transducer 11.

With the foregoing circuit, if the battery 10 is discharged at the time the generator 13 is started, there will be zero gas pressure within the battery, and the impedance of the transducer 11 will be at a maximum. Since the transducer 11 and the resistor 38 form a voltage divider, a positive voltage will appear on the lead 39. Assuming that the battery 10 is a 12-volt battery and that the reference diode 37 produces a 12.8 volt reference, then when the impedance 11 is at a maximum, the transistor 32 will be opened and permit the transistor 27 to remain closed to produce maximum voltage from the generator. This maximum voltage produces a maximum charge on the battery which continues until gas pressure develops within the battery. At this point, the impedance of the transducer 11 starts to decrease and will reach zero impedance at a preselected maximum battery pressure. The transistor 32 then conducts heavily placing the junction 35 at substantially the same potential as the lead 21, turning off the transistor 27 and substantially interrupting the current to the field 17. In normal operation of the device, however, when gas pressure develops within the battery, the charging rate is gradually reduced until a predetermined balance is attained between gas pressure and charging current, whereby the charge continues at a constant battery gas pressure.

One form of variable impedance transducer is illustrated in FIGURE 2. In this embodiment of the invention there is an outer housing 40 of insulating material and having a downwardly extending cylindrical portion 40a which is attached in sealing relationship to a battery cell being charged. In the instant embodiment of the invention the elements 40 and 40a of the case are secured together by screws and with a diaphragm 41 interposed between the elements and sealing the chamber within the housing part 40a.

With this arrangement as the pressure in the battery increases the diaphragm 41 will be deflected upwardly as viewed in the drawing. A plate 42 overlies the diaphragm 41 and carries an arm 42a which engages a substantially horizontal arm 43. The arm 43 is pivoted to the housing by a stud 43a and has an upwardly extending portion 43b. The arm 43 is held downwardly by a spring and set screw assembly generally denoted by the numeral 44 and adjustment of the screw will determine the maximum pressure that will be developed within the battery during the charging period. An essentially tubular resistance element 45 is angularly disposed within the housing 40 and has a curved surface portion 45a on the underside thereof. One end of the resistance element is connected to the terminal 46. A resistance contacting arm 47 is secured at one end to the upper end of the portion 43b of the arm 43 and a spring 47a urges the arm 47 upwardly into firm contact with the surface 45a of the resistor 45. As pressure develops within the battery, the plate 42 will be urged upwardly and it will move the arm 43 about the pivot 43a. This action causes the arm 47 to move over the curve surface of the resistor 45 with the position arm 47 for minimum resistance shown in dotted outline. Electrical connection to the arm 47 may be accomplished in any desired manner and in the present embodiment the pivot 43a is formed of a conductive material so that the electrical connections to the device can be made by attachment of leads to the pivot 43a and the terminal 46.

The form of the invention shown in FIGS. 1 and 2 is particularly adaptable for use in connection with vehicular electrical systems utilizing lead-acid batteries. Tests have indicated, however, that the charging system in accordance with the invention is useful with all types of batteries including, among others, nickel-cadmium and silver-zinc, as the behavior of all of these batteries to conditions such as ambient temperature, battery age, and reaction to charging procedure is substantially identical.

FIGURE 3 is a graph showing the final charge cell voltage (while cell is still under charge) versus temperature characteristics of three types of cells, namely, lead-acid, silver-zinc, and nickel-cadmium, and while the cell voltages differ one from the others, it will be observed that the general slope and shape of the curves is somewhat the same. For instance, a fully charged lead-acid cell at −20° F. develops approximately 2.65 volts, while at 100° F. will develop only 2.2 volts. It is therefore evident even from these curves that any system based on battery voltage as the criterion for determining the fully charged conditions of a battery would be useful at only one predetermined temperature, and any deviation from this temperature would result in either undercharging or overcharging of the battery. Experience has indicated that either overcharging or undercharging a battery will result in material damage.

Another factor of significance in connection with known modes for controlling the charge on batteries is that a battery is not fully charged even if it has attained its maximum voltage at a given temperature. Tests have indicated that during the charge of a battery, the center of the plate is usually the first portion to be charged, and the outer portions of the plate are the last to become charged. The battery will, however, indicate full cell voltage, even though the entire plate is not charged, with the result that in normal charging procedures, while a battery may indicate a full charge as a result of voltage measurements, still additional energy can be stored in the battery without increasing its cell voltage or overcharging it. With this invention, substantially the entire plate areas will be charged with the result that the maximum ampere hour capacity of a battery can be realized.

The graphs of FIGS. 4 and 5 show the results of tests on nickel-cadmium batteries charged in accordance with the invention. In FIGURE 4, the solid black line A illustrates the increase in voltage of a nickel-cadmium cell, when charged at a temperature of −20° F. It will be observed that the voltage increased from 1.35 volts to 2 volts while the internal gas pressure as represented by the curve B built up to a maximum constant level of 24 ounces. The same cell when charged at normal room temperature, as, for instance, 75° F., increased in voltage from 1.3 volts to approximately 1.66 volts and is represented by the broken curve C. The gas pressure in the battery when charged at room temperature is represented by the curve D. If the usual criterion for determining the charge on this cell was followed, the charge would have been terminated when the voltage reached 1.55 volts. Under these conditions, the battery would have approached, but not reached, the full charge at room temperature and at −20° F., the battery would have been charged at only 50% of its capacity. The curves of FIGURE 5 illustrate a significant advantage of the charging system in accordance with the invention. A silver cadmium cell was charged at −20° F. in the manner described in connection with FIGURE 4 and upon attaining a fully charge, the battery was then brought up to room temperature. The battery was then discharged and the initial voltage at the moment of application of the load was approximately 1.4 volts. At the end of a two hour period, during which the battery was discharge at a constant current of two amperes, the voltage fell to 1.16 volts as indicated by the solid line curve denoted by the letter E. The battery was then charged at room temperature in the manner described in connection with FIGURE 4; and at the instant of application of a two hour period under a constant discharge rate, the voltage was 1.16 volts and the drop in voltage is shown by the broken curve F. From the foregoing it is evident that with the charging system in accordance with the invention, a battery can be charged at any temperature to a fully charged state and can be discharged at any other temperature and at the same time realize the full power of the battery. Under known charging modes, a battery charged at a very low temperature will never attain a full charge and batteries charged at relatively high temperatures will be overcharged. Furthermore, charging a battery at a low temperature and then raising it to room temperature will not enable the attainment of full power from the battery.

As previously pointed out, when charging a battery in accordance with the invention wherein the battery is hermetically sealed and the charge is controlled by the gas pressure developed within the battery, it has been found that little if any energy is lost as a result of the gassing phenomena. Batteries left on charge for extended periods of time are not overcharged or damaged in any way as long as the charge is controlled by the generation of gas pressure within the cell actually being charged. When the charge is terminated, it has been found that the gas pressure gradually decreases which indicates re-absorption of the gases in the electrolyte. Inasmuch as electrical energy was required to disassociate the hydrogen and oxygen atoms of the water molecules in the electrolyte, the re-absorption of the hydrogen and oxygen gases indicates that the energy utilized to effect the disassociation has not been lost but has been converted to useful chemical energy which may be subsequently reconverted to electrical energy.

The graph of FIGURE 6 shows a direct comparison between a battery charged under normal conditions and a battery charged in accordance with the invention. In order to make this comparison, it is assumed that a constant charge of one ampere is applied both during the conventional charging mode as well as the charge in accordance with the invention, it being understood that in actual practice of the invention, the charging current would be controlled by the gas pressure of the battery so that the actual gas pressure would not exceed a predetermined maximum. It will be observed from this graph that the charging rate of both batteries is substantially identical during the first seven hours of the charging period and that each battery will have stored approximately seven ampere hours. As the charge continues beyond the seven hour period, identified by the point P on the charging curve R, it will be observed that the rate at which energy is stored in the battery under conventional charging conditions gradually decreases as represented by the curve $R_1$ until the curve $R_1$ becomes substantially asymptotic with the line S at the point $Q_1$. During the charging period from the point P to the point $Q_1$ the charging current remained constant and the total area between the line R and the curve $R_1$ represents an energy loss. The rate of gas generation is represented by the curve $G_1$, and it will be observed that the generation of gas started after the seventh hour of charge which is coincident with the departure of the curve $R_1$ from the line R. The rate of gas generation increases constantly until a full charge is attained, and maximum gas generation occurs as the battery nears its full charge under conventional conditions. The area of energy loss which is shown by the cross-hatched area plus the black area results from the generation and dissipation of heat in the battery during the charge and the energy lost in the production of gas, the latter constituting the major portion of such loss.

Consider now charging a battery at a constant current of one ampere under conditions in accordance with the invention. It will be found that the rate of energy storage continues at a fairly high rate as indicated by the curve $R_2$, which curve becomes asymptotic with the line S at the point $Q_2$ or at the end of approximately 11⅓ hours. Since the battery is hermetically sealed under the conditions presented in FIGURE 6, the rate of gas generation as represented by the curve $G_2$ is greatly reduced, though as previously pointed out, the pressure within the battery will increase materially. Since the energy loss is principally the result of gas generation, it will be observed that the dark area between the curves R and $R_2$ is relatively small. However, inasmuch as the gas is not permitted to escape when a battery is charged under conditions in accordance with the invention, the generated gas, or at least a substantial portion thereof, returns to the electrolyte and is converted into stored energy that may be ultimately reconverted into electrical energy. This follows from the law of conservation of energy since energy is used to generate the gas, and upon reabsorption of the gas by the electrolyte, energy must therefore be imparted to the battery.

From the foregoing, it is quite evident that under conventional charging conditions the time required to produce a full charge is substantially greater than when charging a battery in accordance with the invention and secondly, the energy loss under conventional charging conditions is many times greater than the energy loss when charging a battery in accordance with the invention. It is to be understood that in order to present this direct comparison of the advantages of the improved charging system the total gas pressure within the battery has not been indicated and for this reason, it has been necessary to illustrate a theoretical condition. However, the theoretical condition is an accurate indication of the advantages of this new and improved charging system, though in actual practice, the gas pressure will be limited, and the charging rate would be materially reduced as gas pressure is generated.

The charging system in accordance with the invention may be operated under a variety of conditions in order to attain any desired charging mode. Three different charging modes are illustrated in FIGURE 7. One charging mode is represented by the curve X which utilizes a linear change of resistance of the transducer 11 with changes in the pressure of the battery. Thus, as the pressure gradually increases, the charging rate will decrease proportionally with the increase in pressure. The curve Y illustrates a charging mode wherein the resistance varies substantially logarithmically with the pressure, thus maintaining a relatively high charging rate during the initial period of gas generation and then rapidly decreasing the charging rate as the gas pressure nears a predetermined maximum. The curve Z shows still another charging mode wherein the resistance of the transducer does not change until the pressure reaches a predetermined level, at which point a substantially rapid rate of change of resistance occurs to decrease the charging rate as the pressure reaches the selected maximum.

The invention as thus far described utilized a transducer responsive to gas pressure developed within a battery to vary an electrical characteristic, principally resistance, which in turn was utilized to control the charging rate on the battery. It is significant that control of the charge on the battery is effected by modifying the charging rate in accordance with the gas pressure produced by the passage of a current between the actual plates of the battery and through the electrolyte. By utilizing the variable resistance or other suitable electrical characteristic, when the battery nears its full charge, a balance is obtained between gas pressure and charging rate so that the charging rate will maintain a predetermined gas pressure. Under these conditions, tests have indicated that the battery can be charged for an indefinite period of time without overcharging or otherwise damaging the battery.

In some instances, a modified mode of control of the charging rate may be utilized, and such a modification is illustrated in FIGURE 9. In this case, switching means are utilized and operated in response to the gas pressure in a hermetically sealed battery, so that the switch operates to interrupt the charge when the gas pressure attains a predetermined level and initiates the charge when the gas pressure falls below such predetermined level. In the figure, the numeral 50 denotes a hermetically sealed battery having a transducer 51 threadably attached thereto. More specifically, the transducer 51 has a cylindrical housing 52, the lower end of which has a threaded portion 53 engaging cooperating threads in the battery housing. A flange 54 and sealing washer 55 hermetically seal the transducer to the battery. The cylindrical body 52 is closed at its outer end by a wall 56, and a diaphragm 57 is mounted within the housing and in spaced relationship to the wall 56. A switch 58 is supported within the space between the upper wall 56 and the diaphragm 57 and carries a metal plate 59 secured to a switch operating plunger 60. The metal plate 59 rests against the diaphragm 57 so that as the diaphragm is deflected upwardly, it will operate the switch and open the circuit between the leads 61 and 62 connected to the switch and thereby interrupt the charge on the battery.

In the case of both the transducers 11 and 51, it may be desirable to hermetically seal the transducer as well as the battery so that a predetermined absolute gas pressure will be generated within the battery during the charge notwithstanding variations in the ambient atmospheric pressure.

Tests have indicated that in charging a battery by conventional procedures, as the battery nears completion of the charging cycle, more and more of the input energy is utilized in gas generation. Tests with this invention have shown that when the battery is sealed and nears the completion of its charge, continued charging under pressure will reduce the rate of gas liberation. With the reduction in gas liberation, a greater portion of the input energy is stored as useful chemical energy. Therefore, by charging the battery under pressure, its rate of acceptance of charge is materially increased as the charge nears completion.

While a wide variety of charging procedures may be obtained utilizing the methods and apparatus in accordance with the invention, one particularly advantageous system is illustrated in FIGURE 8.

The battery being charged is denoted by the numeral 65, and the pressure transducer responding to the gas pressure developed in the hermetically sealed battery is generally denoted by the numeral 66. This particular transducer has a resistor, the magnitude of which is varied automatically in accordance with gas pressure of the battery. An alternating current supply is connected to the input terminals 67 and 68, and this energy is fed through a saturable reactor 69 and then through a rectifier and filter 70 and lead 71 to one side of the battery 65. A control amplifier 72 samples both the current and the voltage on lead 71 by means of the connection 73 and in turn is connected via lead 74 to the saturable reactor 69. A current reference 75 having adjusting means 76 is connected via the lead 77 to the control amplifier. The control amplifier 72 and the current reference 75 cooperate to actuate the saturable reactor to maintain the current in the lead 71 at a predetermined maximum determined by the setting of the control 76.

With the structure thus far described and assuming that the battery 65 is discharged, the charging current in the lead 71 will be at a selected maximum. As the battery is charged a gas will be generated within the battery as previously described and actuate the transducer 66 to modify the resistance thereof.

The transducer 66 is connected via the lead 78 to a switch contact 79 and a second switch contact 79' is connected via an adjustable resistor 80 to ground. Switch arm 81, movable between the contacts 79 and 79', is connected to a voltage reference device 82 which is connected via a lead 83 to the control amplifier. When the switch arm 81 is on the contact 79 and gas pressure begins to develop in the battery 65, modification of the resistance of the transducer 66 will produce a control signal on the lead 83 which functions to reduce the charging current on the lead 71 to the battery 65. With this arrangement of elements, the circuit will stabilize at a point wherein the charging voltage across the battery and gas pressure in the battery will remain substantially constant. The gas pressure at which balance occurs can be determined by properly selecting the circuit constants. With this procedure, the battery is charged more rapidly with very low energy loss, and all portions of the battery plates will be charged so that the battery will store considerably more energy than a battery charged under conventional conditions. Furthermore, with the utilization of the gas pressure as the control means for charging the battery, the battery will attain a full charge notwithstanding the ambient temperature, and it will not be subjected to an overcharge as in the case of conventional charging systems. If desired, the charging system of FIGURE 8 can be converted to manual operation by moving the switch contactor 81 to the contact 79' and then controlling the voltage applied to the battery by means of the adjustable resistor 80.

While one form of variable resistance transducer has been described, it is of course apparent that other types of transducers may also be utilized.

In FIGURE 10, the transducer generally denoted by the numeral 85 includes a cylindrical housing 86 closed at the outer end by a wall 87 and having a threaded portion 88 for threadably securing it to a battery 89. A bellows 90 is hermetically sealed to an inwardly extending ledge 91, and it has a central opening 92 communicating with the battery cell. The upper surface of the bellows 90 carries a movable contactor 93 riding on a resistance element 94. Movement of the bellows in response to gas pressure will therefore modify the resistance between the leads 95 and 96.

FIGURE 11 illustrates a pressure responsive transducer wherein a block of pressure sensitive material 97 is retained between a flexible diaphragm 98 and a block of insulating material 99 contained within the suitable housing 100. As the pressure within the battery 89 increases, the resistance of the pressure sensitive material 97 will be modified, and this change in resistance will be sensed by attachment of leads 101 and 102 to the top and bottom surfaces of the pressure sensitive element 97.

In normal application, the transducers heretofore described would generally be vented to the ambient pressure so that the pressure within the battery being charged would attain a predetermined level relative to the ambient pressure. In certain applications, as, for instance, aircraft wherein very substantial changes in ambient pressure are experienced, it would be desirable to house the battery and transducer in a hermetically sealed container. This form of the invention is shown in FIGURE 12, wherein the battery is generally denoted by the numeral 103 and provided with a pressure sensitive transducer 104. The entire structure is housed in a hermetically sealed outer container 105, the latter being provided with leads sealed in the container walls for attachment of the battery terminals 106 and 107 and the transducer leads 108 and 109 to external circuits.

Conventional vehicular batteries, such as the 12-volt battery presently used in automobiles, may be readily adapted for use in connection with the charging system in accordance with the invention. For this purpose, an appropriate manifold 110 is provided as illustrated in FIGURES 13 and 14 for attachment to the filler caps of the battery. More specifically, the manifold 110 has a box-like structure 111 with side walls 112, a bottom wall 113 and end walls 114 and 115. The bottom 113 has a plurality of openings therein aligned with the normal filler caps of the battery and adaptor plugs 116 are inserted through the openings in the bottom 113 and threaded into the top of the battery generally denoted by the numeral 117. The adaptor plugs 116 have a central opening 116' to vent each of the cells into the manifold. The top plate 118 of the manifold is removably sealed in position and has a transducer 119 mounted on the surface thereof. With this arrangement, the pressure developed by each of the cells is vented into the manifold, and the pressure transducer will respond to the average pressure developed by all of the cells.

FIGURE 15 is a side elevational view of a battery specifically arranged for incorporation in a charging system in accordance with the invention. For this purpose, each of the separators 120 dividing the six cells one from the others are provided with vents 121 which vent all of the cells one into the others. A single transducer 122 is connected with one of the cells, and accordingly, the transducer will respond to the average gas pressure developed by all of the cells.

If desired, the hermetically sealed batteries utilizing the transducers in accordance with the invention may be provided with safety or relief valves to prevent any possibility of the pressure within the battery exceeding a predetermined upper limit. One such safety or relief valve is illustrated in FIGURE 15 and denoted by the numeral 123.

While only certain embodiments of the invention have been illustrated and described, it is apparent that alterations, modifications and changes may be made without departing from the true scope and spirit thereof as defined by the appended claims.

What is claimed is:

1. Apparatus for charging a battery containing at least one cell formed of a pair of electrodes immersed in an electrolyte comprising a pressure transducer affixed to said cell, said transducer having electrical means and producing a change in an electrical characteristic in response to changes in gas pressure within said cell, means applying a voltage across the electrodes of said cell to charge the battery and electrical connections between the electrical means in said transducer and the last said means to control the voltage applied to said cell in accordance with pressure changes therein to maintain a predetermined pressure at all times.

2. Apparatus in accordance with claim 1 wherein said transducer includes a variable resistance device and the pressure within said cell operates to vary the resistance of said device.

3. Apparatus for charging a battery having at least one cell with at least two electrodes immersed in an electrolyte comprising a source of charging voltage, means for modifying the magnitude of the voltage produced by said source, a pressure transducer coupled to said cell and producing a change in an electrical characteristic, connections between said source and said battery for applying a charging voltage thereto, said charging voltage having a magnitude sufficient to develop material production of gas in said battery and connections between said pressure transducer and said voltage modifying means to limit the gas pressure to a predetermined maximum value at all times.

4. Apparatus according to claim 3 wherein said transducer produces a change in resistance with pressure changes and said voltage modifying means comprises a regulator having semi-conductor controlling elements.

5. Apparatus according to claim 3 wherein said voltage source comprises an alternator and rectifying means, said voltage modifying means includes a transistor control interconnected with said alternator to control the voltage delivered thereby and said transducer includes a resistor variable in accordance with pressure changes and controlling said transistor control to limit the gas pressure to said predetermined maximum value.

6. Apparatus for charging a battery according to claim 3 wherein said battery comprises a plurality of cells and a manifold connecting said cells one to the other, said transducer being coupled to said manifold to sense the average pressure in said cells.

7. Apparatus according to claim 3 wherein said battery and transducer are contained within a hermetically sealed housing.

References Cited by the Examiner

UNITED STATES PATENTS

| | | | |
|---|---|---|---|
| 2,621,317 | 12/1952 | Ihrig | 320—46 |
| 2,846,549 | 8/1958 | Body | 338—42 |
| 2,867,769 | 1/1959 | Hunt et al. | 338—42 X |
| 2,877,327 | 3/1959 | Hastings | 338—42 |
| 2,999,969 | 9/1961 | Fritzinger et al. | 320—46 X |
| 3,011,115 | 11/1961 | Grady | 320—64 |
| 3,123,758 | 3/1964 | Giacalone | 320—46 X |

JOHN F. COUCH, *Primary Examiner.*

LLOYD McCOLLUM, *Examiner.*

S. WEINBERG, *Assistant Examiner.*